Dec. 7, 1943.    N. M. MICHAILOVSKY    2,336,413
DRIVING LIGHT
Filed Dec. 6, 1941
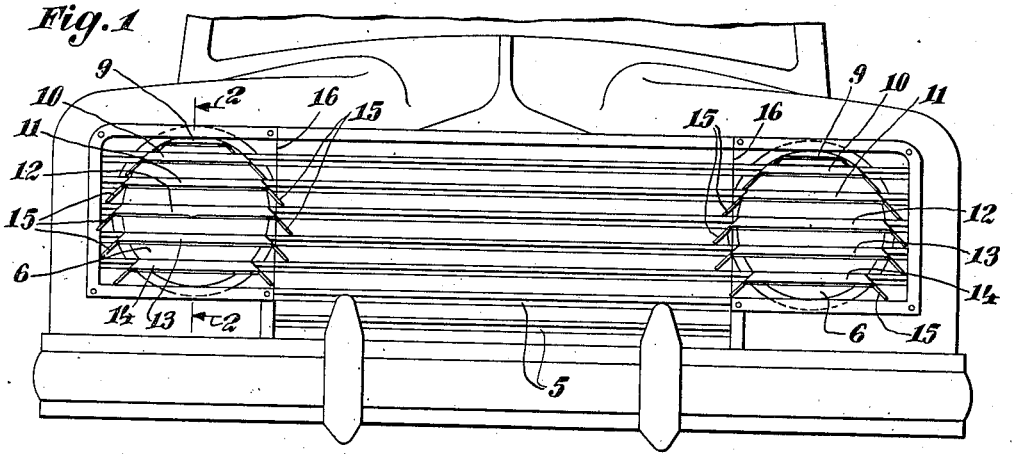
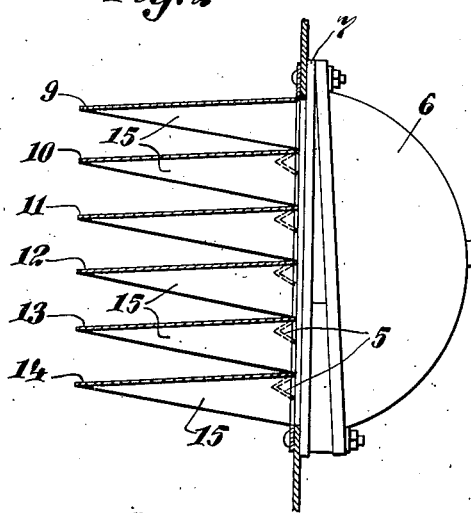
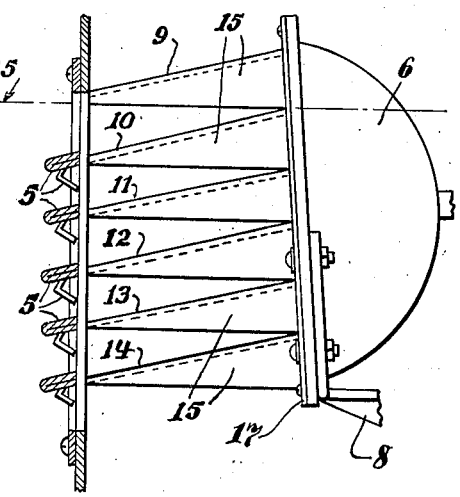
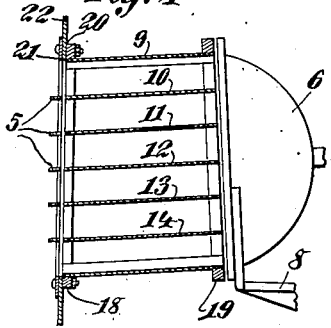
INVENTOR.
Nicholas M. Michailovsky,
BY
Philip S. McLean
ATTORNEY.

Patented Dec. 7, 1943

2,336,413

UNITED STATES PATENT OFFICE 2,336,413

DRIVING LIGHT

Nicholas M. Michailovsky, Westport, Conn.

Application December 6, 1941, Serial No. 421,903

1 Claim. (Cl. 240—8.11)

The invention herein disclosed relates to the illumination of roadways for driving purposes.

An earlier Michailovsky Patent 1,713,294, of May 14, 1929, on "Road illumination" discloses a practical method of illuminating by sub-dividing the beams of light from the lamps horizontally into sections which can be fully shielded by relatively short forwardly extending downwardly inclined small visor-like shields.

The primary objects of this invention are to adapt that practical method of road illumination to present-day streamlined designs of motor vehicles and to accomplish this without sacrificing the desirable light directing and light shielding effects.

Particularly, it is a purpose of the invention to cut off the upwardly directed side rays of the lamps which cause interference under fog conditions by reflecting back into the driver's eyes. Also to so shield the light from driving lamps as to be practically not observable when viewed from above, as is desirable under "blackout" conditions.

Other objects of the invention are to incorporate the light shielding construction as a unitary or unified portion of the front-end structure of the car, to provide this in simple, practical and inexpensive form and to provide as well all necessary accessibility to the lamps.

Other desirable objects and the novel features by which the purposes of the invention are attained are hereinafter set forth or will appear as the specification proceeds.

The drawing accompanying and forming part of the specification illustrates different practical embodiments of the invention, but structure may be further modified and changed, as regards the present disclosure, all within the true intent and scope of the invention as hereinafter defined and claimed.

Fig. 1 is a front elevation of a motor car having the new driving lights incorporated therein.

Fig. 2 is a broken part sectional view as on substantially the plane of line 2—2 of Fig. 1.

Fig. 3 is a similar view of a modified form of the invention.

Fig. 4 is a like view of another modification.

In Fig. 1, a typical front-end construction is illustrated embodying a grille, made up of horizontally extending spaced bars 5, usually more or less ornamental in character. This grille is shown as extending substantially full width of the car body and therefore as including the spacing required for the front driving lights.

Fig. 2 shows one of the lamps 6, mounted in downwardly tilted relation at the back of the front grille to direct the beam of light downwardly onto the roadway a proper distance ahead of the car.

Various means for mounting the lamps at the back of the grille may be utilized. Actually, the lamps may be supported on the back of the frame or body structure of the grille as indicated at 7, Fig. 2, or in some instances, the lamps may be mounted on special supporting brackets 8, as indicated generally in Figs. 3 and 4.

In the instances illustrated, the total light directed forwardly and downwardly by the reflector of the lamp is divided horizontally into vertically narrow layers or sections by a series of shields, such as indicated at 9, 10, 11, 12, 13, 14, inclined downwardly and forwardly, substantially parallel with the axis of the beam and of sufficient forward extent to substantially shield the light source from the eyes of oncoming drivers or pedestrains on the road substantially as disclosed in the above identified patent.

The shields may be of thin metal or other materials and may or may not have downwardly inclined side wings 15, 15, also as in the patent.

The under or inside surfaces of the shields may be reflective and externally they may be finished to match the finish and appearance of the car. In so finishing, these upper surfaces may be non-reflective and may be distinctly colored, for example, red for one lamp and green for the other.

The spacing of the bars of the grille may determine to some extent the spacing of the shields, since the light is projected between the bars of the grille, but in a preferred construction, the shields would be designed as in the patent to cover the source of the light from an observer on the roadway and the spacing of the grille bars, at least over the lamps, be made to match or harmonize with such spacing of the shields. Thus as shown in Fig. 3, the lower forward end of one downwardly inclined light shield such as 9, may be in substantially horizontal alignment with the rearward upper end of the next shield 10, below the same, as indicated by the horizontal line 25.

In the first form, Figs. 1 and 2, where the shields project forwardly from the grille, such shields may be constructed as integral or attached portions of the grille bars 5.

In the second form of the invention shown in Fig. 3, the lamp is set back from the grille sufficiently for the extension of the shields 9, 10, etc., entirely at the back of the grille in line with the grille bars 5, and which latter may be narrowed down at such points, so as not to appreciably obstruct the layers of light shielded by the visors.

The side portions of the grille over the lamps may be made separately removable as on the lines 16, 16, Fig. 1, to provide easy access to the lamps at the back of the grille.

In Fig. 3, the shields are shown carried by a ring or frame 17, removably attached to the front of the lamp housing, thus to provide ready access to the lamp after removal of the front grille section.

With the shields matched up with and in effect constituting the front part of the grille bars, the extent of projection can be reduced and such shields are less noticeable and not at all objectionable from either structural or appearance standpoints, particularly so in the second form, where the existence of the shields may not ordinarily be observable.

The combining of the light shields with the grille bars assures a continuous circulation of air, tending to scour and keep the shields clean at all times. However, the ready removability enables the shields to be easily cleaned at any time, if that should become necessary.

While the invention is shown in connection with the driving lights, located at the sides of the car, it will be apparent that the lights may be combined with the grille in other locations and that the lamps may be other than the usual driving lamps, such as spotlights and the like. The location of the lamps back of the grille permits utilization of the invention in various forms and styles of front-end constructions. The grille may be in a single or multiple sections and may in some instances, have openings to receive the lamps and to receive frame structures carrying the shields. The shields preferably are connected in some unitary form and this whole shield unit may be at the front or at the back of the grille and may be supported by the grille or by the lamp or be mounted independently of either.

Fig. 4 illustrates a construction in which the shields 9, 10, 11, etc., are connected together in desirable substantially parallel relation by the surrounding shell or rings 18, 19, and this unit fastened on the back of the grille structure at 20, and so supported independently of the lamp 6. In a construction like this, the sections of the grille bars 5, in front of the shields may be carried by and actually form parts of such shields, in which event, the shields and these grille bar sections may be carried by a frame such as that shown at 21, applied over the front of the grille, fender or car body structure 22.

If desired, the grille openings over the shields may be protected by glass, transparent plastic or the like, either in the single piece or in separate sections for each shield.

While usually desirable that the shields align with and register with the bars of the grille, so as to appear practically as continuations of the same, it is realized that the shields need not actually register with the grille bars and in fact, the invention, involving the horizontally disposed light shields may be incorporated in a grille structure even having vertically extending bars, in such case, openings being provided in the normal grille structure to admit the lamps and the horizontally disposed shields for the same.

What is claimed is:

In combination with the front end grille structure of a motor vehicle having vertically spaced horizontally extending bars and including a removable section, a driving lamp, means independent of said grille for mounting said driving lamp in back of said removable section of said grille structure in downwardly and forwardly inclined relation, a frame attached to said lamp structure, a plurality of horizontally disposed vertically spaced flat light shields carried by said frame and projecting forwardly in downwardly inclined relation and with the forward and lower ends of the same in substantially horizontal alignment with the rearward upper ends of the light shields below the same, the upper surfaces of said light shields being nonreflective and the underfaces being reflective, the horizontally extending grille bars of said removable grille section being inclined similarly to said forwardly inclined light shields and in alignment with the forward lower edges of the latter and downwardly inclined side wings on said light shields for confining and directing the light from the lamp through said removable grille section between said inclined grille bars.

NICHOLAS M. MICHAILOVSKY.